(12) United States Patent
Matsumoto et al.

(10) Patent No.: US 11,709,504 B2
(45) Date of Patent: Jul. 25, 2023

(54) PLATOONING SYSTEM

(71) Applicant: HONDA MOTOR CO., LTD., Tokyo (JP)

(72) Inventors: Tadashi Matsumoto, Saitama (JP); Yoshimitsu Ishida, Tokyo (JP); Koji Aoki, Saitama (JP); Yuichi Kawasaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 262 days.

(21) Appl. No.: 16/985,689

(22) Filed: Aug. 5, 2020

(65) Prior Publication Data

US 2021/0041893 A1     Feb. 11, 2021

(30) Foreign Application Priority Data

Aug. 9, 2019 (JP) .............................. JP2019-147306

(51) Int. Cl.
  *G05D 1/02*   (2020.01)
  *H04W 4/46*   (2018.01)
  *G08G 1/00*   (2006.01)
  *B60W 50/04*  (2006.01)

(52) U.S. Cl.
  CPC ......... *G05D 1/0295* (2013.01); *G05D 1/0293* (2013.01); *G08G 1/22* (2013.01); *H04W 4/46* (2018.02); *B60W 2050/048* (2013.01); *G05D 2201/0213* (2013.01)

(58) Field of Classification Search
  CPC ............... G05D 1/0295; G05D 1/0293; G05D 2201/0213; G08G 1/22; H04W 4/46; B60W 2050/048
  See application file for complete search history.

(56) References Cited

U.S. PATENT DOCUMENTS

2010/0256835 A1   10/2010   Mudalige
2015/0154871 A1   6/2015    Rothoff et al.
(Continued)

FOREIGN PATENT DOCUMENTS

CN   101859494 A   10/2010
CN   104700612 A   6/2015
(Continued)

OTHER PUBLICATIONS

First Notification of Office Action for Patent Application CN 202010783468.8 dated Feb. 28, 2022; 22 pp.
(Continued)

*Primary Examiner* — Behrang Badii
*Assistant Examiner* — Jay Khandpur
(74) *Attorney, Agent, or Firm* — Armstrong Teasdale LLP

(57) ABSTRACT

A platooning system for causing multiple vehicles to travel in a platoon includes: a management device configured to set an order of the vehicles in the platoon; a transmission device mounted on each vehicle and configured to transmit driving information regarding a driving state of the vehicle; a reception device mounted on each vehicle and configured to receive the driving information of at least one of the vehicles; and a control device mounted on each vehicle and configured to control an operation of the vehicle based on the driving information, wherein the management device is configured to arrange the vehicles from a front end to a rear end with respect to a travel direction in an ascending order of driving performances of the vehicles.

7 Claims, 9 Drawing Sheets

| ID | driving performance | | | | | | |
|---|---|---|---|---|---|---|---|
| | acceleration performance (sec) | braking performance (m) | minimum turning radius (m) | width (mm) | total length (mm) | weight (kg) | motor vehicle type |
| 001 | 4.0 | 20 | 7.0 | 1960 | 4500 | 1920 | ordinary motor vehicle |
| 002 | 30.0 | 100 | 11.0 | 2520 | 11900 | 9010 | large-sized motor vehicle |
| . | . | . | . | . | . | . | . |
| . | . | . | . | . | . | . | . |
| . | . | . | . | . | . | . | . |

(56) References Cited

U.S. PATENT DOCUMENTS

| | | | |
|---|---|---|---|
| 2018/0081368 A1* | 3/2018 | Watanabe | G05D 1/0285 |
| 2018/0188725 A1 | 7/2018 | Cremona et al. | |
| 2019/0080373 A1 | 3/2019 | Takoshima et al. | |
| 2019/0171227 A1* | 6/2019 | Sujan | G05D 1/0295 |
| 2019/0196501 A1* | 6/2019 | Lesher | B60T 8/1708 |
| 2019/0286163 A1* | 9/2019 | Yasuda | G05D 1/0088 |
| 2019/0373419 A1* | 12/2019 | Bayley | H04W 4/46 |
| 2020/0042017 A1* | 2/2020 | Kelkar | G01S 5/0072 |
| 2020/0064140 A1* | 2/2020 | Tarkiainen | G08G 1/096811 |
| 2020/0361369 A1* | 11/2020 | Yamaguchi | G08G 1/22 |
| 2022/0076580 A1* | 3/2022 | Park | G06V 20/00 |

FOREIGN PATENT DOCUMENTS

| | | | |
|---|---|---|---|
| CN | 108594824 A | | 9/2018 |
| JP | H10293899 A | | 11/1998 |
| JP | H11283180 A | | 10/1999 |
| JP | 4821498 B2 * | | 11/2011 |
| JP | 2014153950 A | | 8/2014 |
| JP | 6432834 B2 * | | 12/2018 |
| JP | WO2018043753 A1 | | 6/2019 |
| JP | 2012238169 | | 12/2020 |
| WO | 2017209124 A1 | | 12/2017 |
| WO | WO-2019068398 A1 * | | 4/2019 |

OTHER PUBLICATIONS

Notice of Reasons for Refusal for Japanese Patent Application No. 2019-147306 dated Nov. 10, 2022; 8 pp.

* cited by examiner

Fig.3

| ID | driving performance | | | | | | motor vehicle type |
|---|---|---|---|---|---|---|---|
| | acceleration performance (sec) | braking performance (m) | minimum turning radius (m) | width (mm) | total length (mm) | weight (kg) | |
| 001 | 4.0 | 20 | 7.0 | 1960 | 4500 | 1920 | ordinary motor vehicle |
| 002 | 30.0 | 100 | 11.0 | 2520 | 11900 | 9010 | large-sized motor vehicle |
| ... | ... | ... | ... | ... | ... | ... | ... |

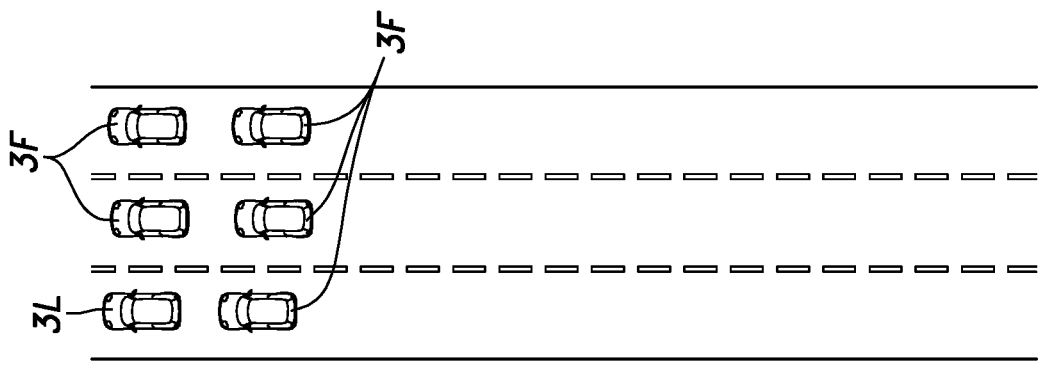
Fig.4D
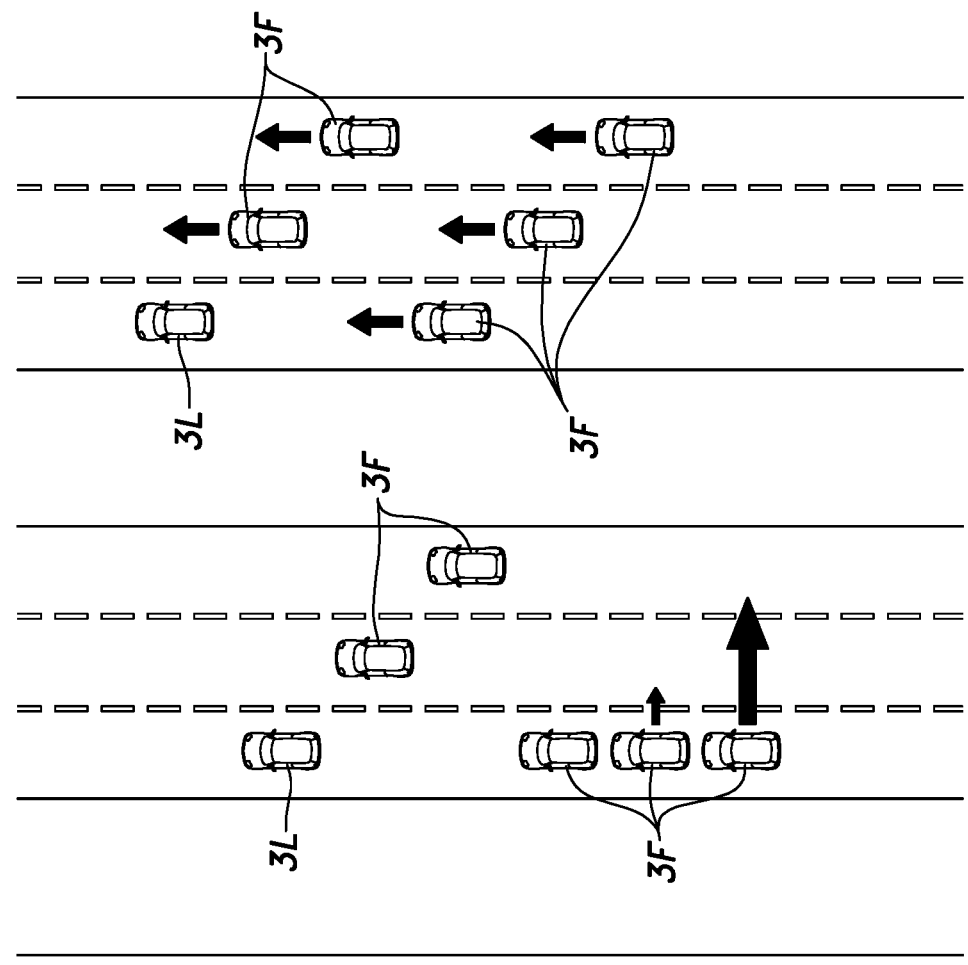
Fig.4C
Fig.4B
Fig.4A

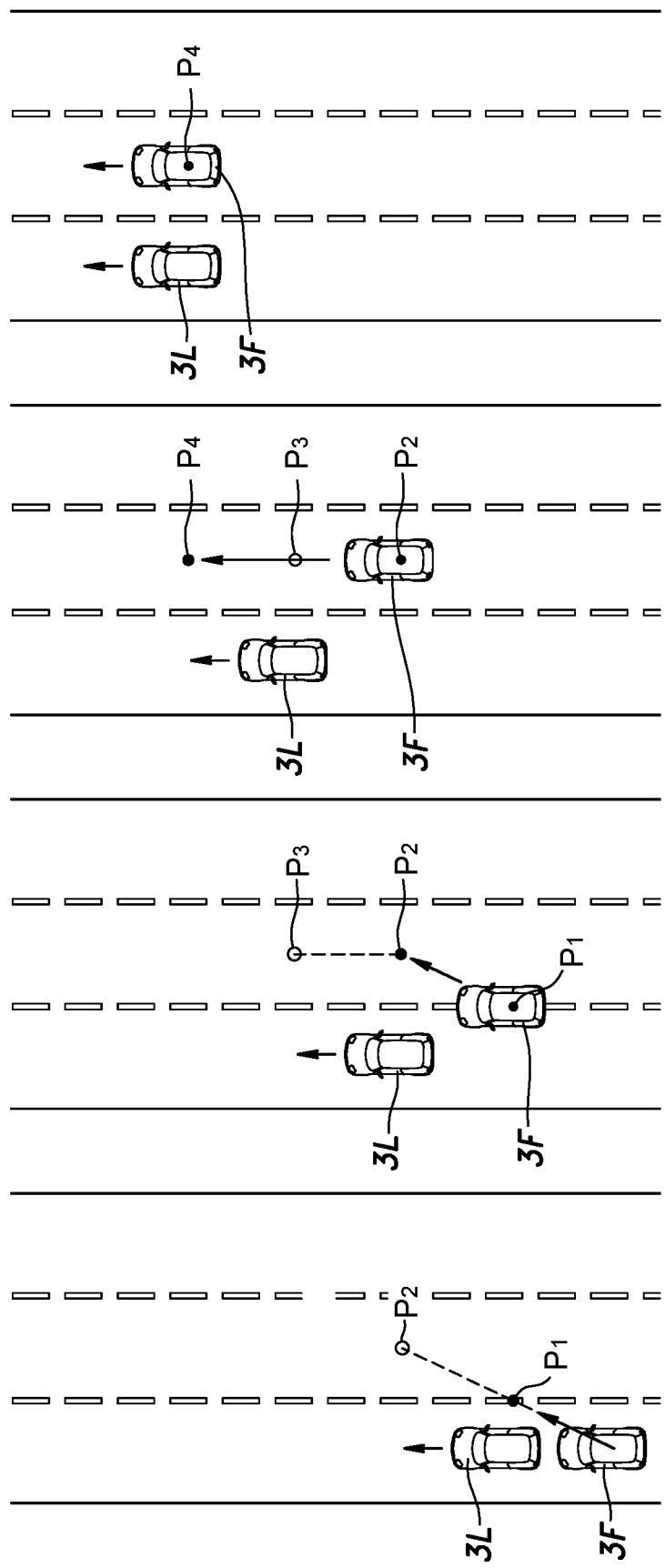

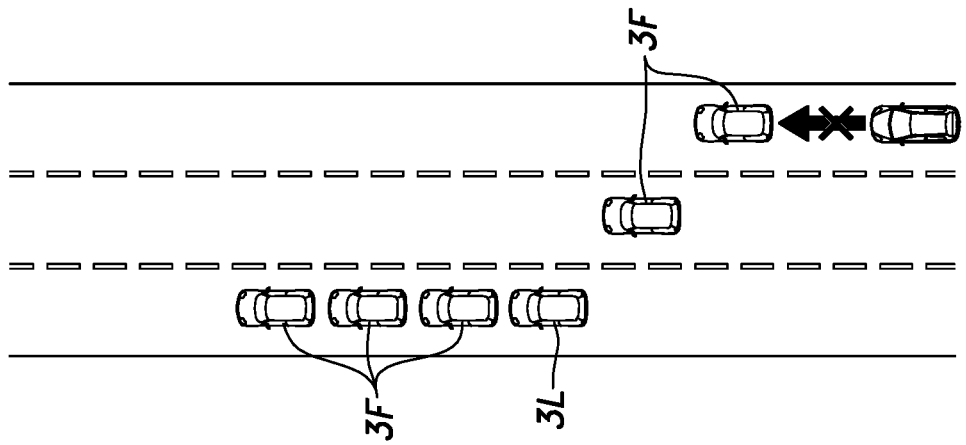
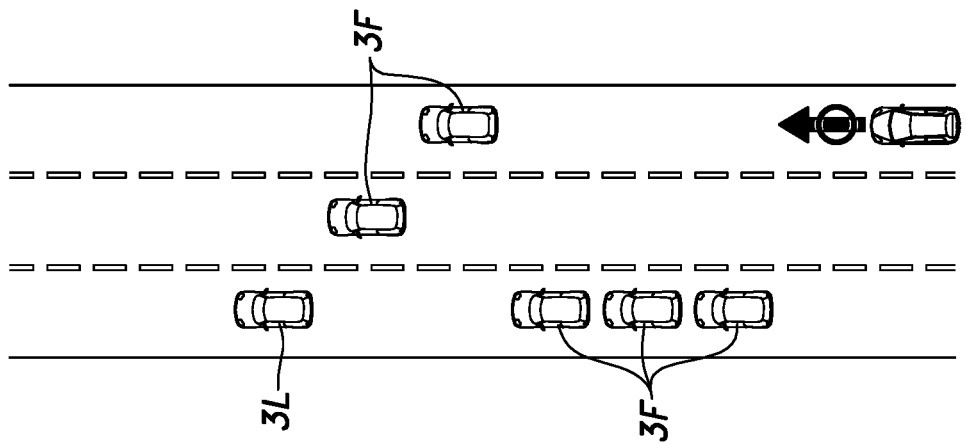

PLATOONING SYSTEM

TECHNICAL FIELD

The present invention relates to a platooning system for causing multiple vehicles, each capable of following another vehicle, to travel in a platoon.

BACKGROUND ART

There is known a platooning system for causing multiple vehicles having an automated driving function to travel in a platoon (for example, WO2017/209124A1). In the platooning system disclosed in WO2017/209124A1, an arrangement order of the vehicles in the platoon is determined based on the characteristics of each vehicle so as to minimize the fuel consumption amount.

There is also known a platooning system configured to reduce the possibility that the platoon may be divided into separate parts at an intersection (see JP2012-238169A, for example). In the platooning system disclosed in JP2012-238169A, whether the platoon will be divided at an intersection is determined based on traffic signal information regarding the switching of the signal color of the traffic signal provided at the intersection, the length of the platoon, and the speed and position of each vehicle in the platoon. When it is determined that the platoon would be divided at the intersection, the vehicles are decelerated so that the whole platoon can stop before the intersection or the vehicles are accelerated with an acceleration within a tolerable range so that the rear-end vehicle of the platoon can clear the intersection.

It is to be noted that the response of each following vehicle in the platoon to the leading vehicle tends to be delayed more as the following vehicle is positioned closer to the rear end of the platoon due to the delay in the signal transmission or the like. Therefore, as described in JP2012-238169A, if the leading vehicle is accelerated when the platoon passes an intersection, those of the following vehicles positioned at or near the rear end of the platoon may fall behind the leading vehicle significantly so that the platoon may be divided into separate parts.

SUMMARY OF THE INVENTION

In view of the foregoing background, a primary object of the present invention is to provide a platooning system that can prevent the platoon from being divided into separate parts.

To achieve the above object, one embodiment of the present invention provides a platooning system (1) for causing multiple vehicles (3) to travel in a platoon, comprising: a management device (6) configured to set an order of the vehicles in the platoon; a transmission device (35) mounted on each vehicle and configured to transmit driving information regarding a driving state of the vehicle; a reception device (35) mounted on each vehicle and configured to receive the driving information of at least one of the vehicles; and a control device (37) mounted on each vehicle and configured to control an operation of the vehicle based on the driving information, wherein the management device is configured to arrange the vehicles from a front end to a rear end with respect to a travel direction in an ascending order of driving performances of the vehicles.

According to this configuration, the following vehicles in the platoon are arranged such that one located closer to the rear end of the platoon has a higher driving performance. Thereby, even when there is a delay in the signal transmission from the leading vehicle to the following vehicles or the like, it is possible to allow the vehicles at or near the rear end of the platoon to follow the leading vehicle and thereby to prevent the platoon from being divided into separate parts.

In the above configuration, preferably, the driving performance of each vehicle is determined based on a vehicle specification including at least one of a braking performance, a minimum turning radius, an acceleration performance, and a size of the vehicle.

According to this configuration, it is possible to easily evaluate an ability of each following vehicle to follow the leading vehicle.

In the above configuration, preferably, the management device is configured to acquire multiple travel routes to a given destination and to select one of the acquired travel routes that the platoon can travel along.

According to this configuration, it is possible to allow the platoon to arrive at the destination more reliably without being divided into separate parts.

In the above configuration, preferably, the management device is configured to reject inclusion of a vehicle into the platoon when the driving performance of the vehicle is lower than a prescribed criteria.

According to this configuration, it is possible to prevent a vehicle having a driving performance lower than the criteria from being included in the platoon. Thereby, it is ensured that the integrity of platoon is not impaired by a vehicle having a driving performance lower than the criteria and this contributes to maintain the integrity of the platoon.

According to another embodiment of the present invention, there is provided a platooning system (1) for causing multiple vehicles (3) to travel in a platoon in which one or more following vehicles follow a leading vehicle, the system comprising: a management device (6) configured to set a formation of the platoon and an arrangement of the vehicles in the platoon; a transmission device (35) mounted on the leading vehicle and configured to transmit a driving state of the leading vehicle; a reception device (35) mounted on each following vehicle and configured to receive the driving state of the leading vehicle from the transmission device; and a control device (37) mounted on each following vehicle and configured to control the vehicle on which the control device is mounted based on a signal received by the reception device of the vehicle on which the control device is mounted, wherein the management device is configured to set the formation of the platoon to one of multiple formations having mutually different total lengths.

According to this configuration, by changing the formation of the platoon to thereby changing the total length of the same, it is possible to reduce the time required from when the platoon enters an intersection to when the all vehicles of the platoon pass (or exit) the intersection, for example. Thereby, when the platoon passes the intersection, the platoon can be prevented from being divided into separate parts.

In the above configuration, preferably, the management device is configured to set the formation of the platoon and the arrangement of the vehicles to fully use a width of a pathway on which the platoon travels.

According to this configuration, the formation of the platoon and the arrangement of the vehicles can be determined to fully use the road width. Thereby, the formation of the platoon can be changed in accordance with the road width to effectively prevent the dividing of the platoon.

In the above configuration, preferably, the management device is configured to change the formation of the platoon and the arrangement of the vehicles so as to reduce the total length of the platoon immediately before the platoon reaches a prescribed section where a time during which the section can be passed is limited or when the platoon is passing the prescribed section.

According to this configuration, compared to a case where the formation of the platoon and the arrangement of the vehicles are not changed to reduce the total length of the platoon, it is possible to reduce the time required for the platoon to pass the section where the time during which the section can be passed is limited. Thereby, it is possible to prevent the platoon from being divided into separate parts.

In the above configuration, preferably, the vehicle at a front end of the platoon is provided with a notifying device (31) for making a notification to a vehicle occupant, and when the management device changes at least one of the formation of the platoon and the arrangement of the vehicles immediately before the platoon reaches the prescribed section or when the platoon is passing the prescribed section, the notifying device makes a notification to the vehicle occupant.

According to this configuration, when the formation of the platoon and/or the arrangement of the vehicles is to be changed, a notification is made to the occupant of the leading vehicle. Thereby, the occupant of the leading vehicle can operate the leading vehicle such that the change can be achieved smoothly.

In the above configuration, preferably, the system further comprises an external environment recognizing device (34) mounted on each following vehicle and configured to recognize environment ahead of the vehicle on which the external environment recognizing device is mounted, wherein the control device mounted on each following vehicle is configured such that, when the external environment recognizing device of the vehicle on which the control device is mounted recognizes another vehicle located ahead of the vehicle on which the control device is mounted with respect to a travel direction, the control device controls the vehicle on which the control device is mounted based on a signal received by the reception device of the vehicle on which the control device is mounted and a position of the vehicle located ahead of the vehicle on which the control device is mounted.

According to this configuration, it is possible to cause each following vehicle to follow the leading vehicle while preventing each following vehicle from colliding with the vehicle located ahead of each following vehicle with respect to the travel direction.

According to the foregoing configuration, a platooning system that can prevent the platoon from being divided into separate parts can be provided.

BRIEF DESCRIPTION OF THE DRAWINGS

FIG. 3 is a diagram showing an example of a vehicle information table;

FIG. 4A is an explanatory diagram showing the vehicles in a single-row formation;

FIG. 4B is an explanatory diagram showing the change process for moving the vehicles from the single-row formation of FIG. 4A to a multi-row formation;

FIG. 4C is an explanatory diagram further showing the change process for moving the vehicles of FIG. 4A to a multi-row formation;

FIG. 4D is an explanatory diagram showing the vehicles in the multi-row formation;

FIG. 6A is an explanatory diagram for explaining an arrangement of vehicles and the position of a target point of the following vehicle when the vehicles are traveling in the single-row formation;

FIG. 6B is an explanatory diagram for explaining an arrangement of vehicles and the position of a target point of the following vehicle when the following vehicle is changing the lane;

FIG. 6C is an explanatory diagram for explaining an arrangement of vehicles and the position of a target point of the following vehicle when the lane change is completed;

FIG. 6D is an explanatory diagram for explaining an arrangement of vehicles and the position of a target point of the following vehicle when the change to the multi-row formation is completed;

FIG. 7A illustrating the vehicles in the multi-row formation;

FIG. 9A is an explanatory diagram for explaining cut-in by a non-platooning vehicle during the single-row to multi-row formation change process shown in FIGS. 4A to 4D; and FIG. 9B is an explanatory diagram for explaining cut-in by a non-platooning vehicle during the single-row to multi-row formation change process shown in FIGS. 8A to 8D.

DESCRIPTION OF THE PREFERRED EMBODIMENT(S)

In the following, an embodiment of the platooning system according to the present invention will be described with reference to the appended drawings.

Figure 1:
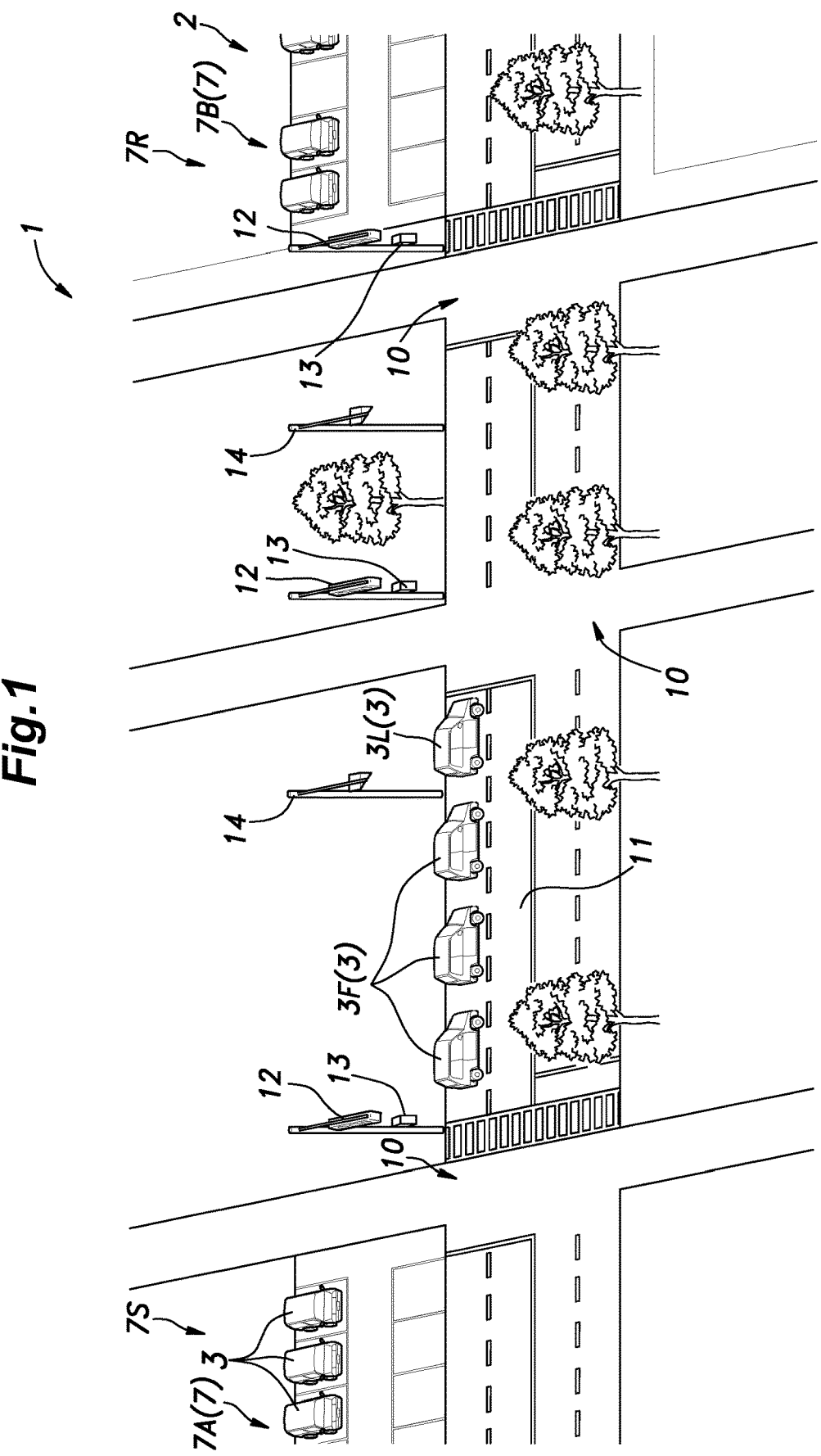
FIG. 1 is an explanatory diagram showing the configuration of a car sharing system provided with a platooning system according to an embodiment of the present invention.
Figure 2:
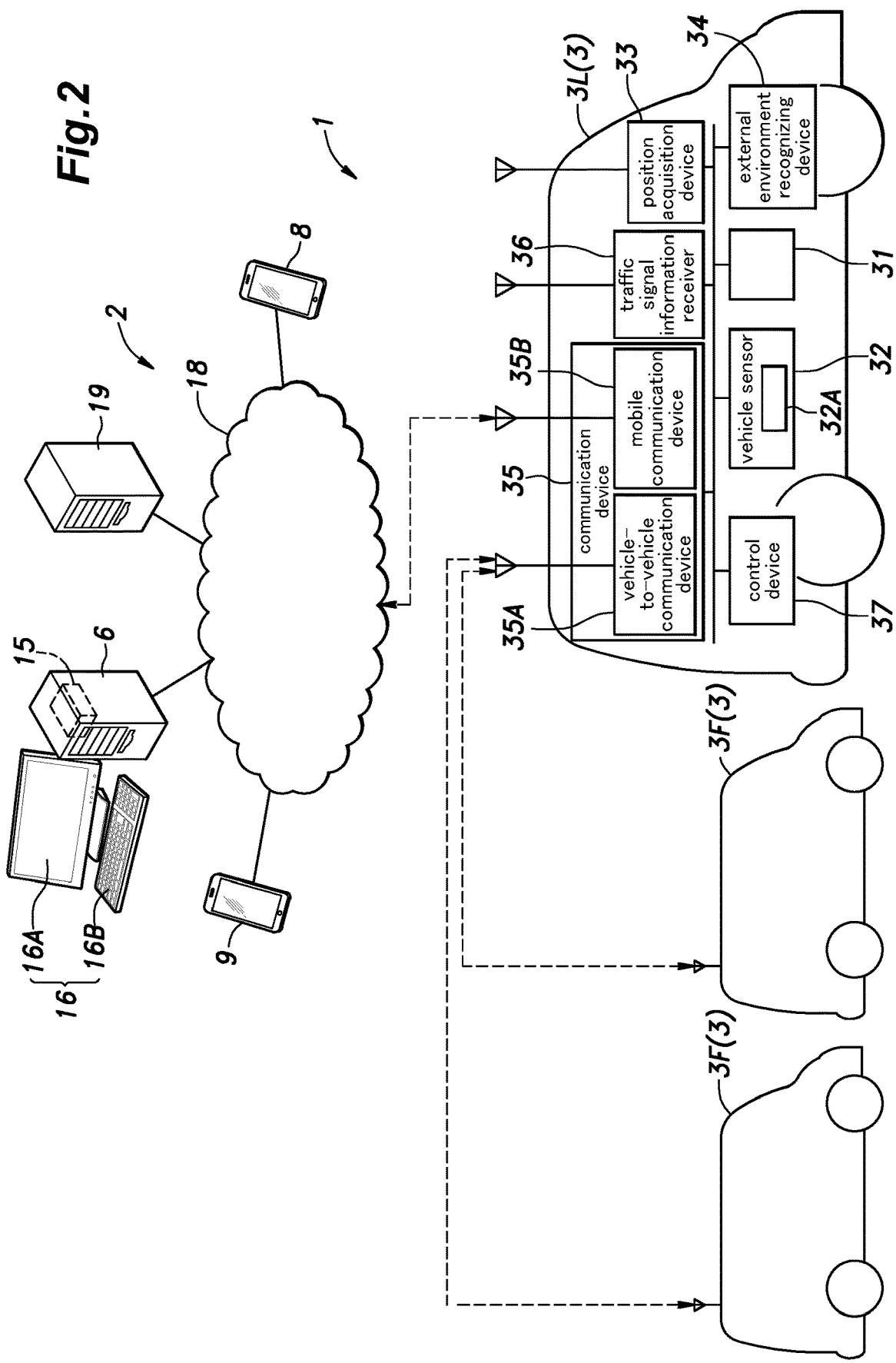
FIG. 2 is a block diagram showing the configuration of each vehicle.

The platooning system 1 is incorporated in a car sharing system 2 for providing car sharing service. The car sharing system 2 is a system for renting a desired vehicle 3 to a user, and as shown in FIG. 1, includes multiple vehicles 3 and a vehicle management server 6. The vehicles 3 are provided with respective identification numbers (IDs) and are distributed to multiple stations 7.

Each of the users who utilize the car sharing service carries a user terminal 8 such as a smart phone. The user makes a reservation of the vehicle 3 by inputting reservation information including the usage time of the vehicle 3 and the station where the user desires to pick up the vehicle 3 and transmitting the reservation information to the vehicle management server 6. Thereafter, the user goes to the station 7 indicated in the reservation information to pick up the vehicle 3.

The vehicles 3 available at each station 7 are managed by a worker at the station 7. The worker carries a worker terminal 9 capable of communicating with the vehicle management server 6. The worker terminal 9 may be a mobile phone or a smart phone. The worker terminal 9 is equipped with a human machine interface (HMI) for notifying information to the worker and receiving input from the worker. The HMI is preferably constituted of a touch panel.

As mentioned above, the platooning system 1 includes multiple vehicles 3 and a vehicle management server 6. The platooning system 1 is used to deliver multiple vehicles 3 between two stations 7 (hereinafter referred to as a first station 7A and a second station 7B) by causing the vehicle 3 driven by the worker (hereinafter referred to as a leading vehicle 3L) to be followed by the other vehicles 3 (hereinafter referred to as following vehicles 3F) such that the multiple vehicles 3 form a platoon.

In the following description, the first station 7A and the second station 7B are connected to each other by a road 11. The road 11 is constituted of multiple lanes and multiple intersections 10. At each intersection 10, a traffic signal 12, a traffic signal control device 13 configured to control the traffic signal 12, and a traffic signal information transmission device 14 configured to transmit traffic signal information to the vehicles 3 are provided. Due to the associated traffic signal 12, each intersection 10 makes a section where the time during which the section can be passed by the vehicles is limited. Each traffic signal information transmission device 14 may be an optical beacon configured to transmit VICS (registered trademark) information including traffic jam information, traffic control information, etc. The traffic signal information transmission device 14 is installed to be placed above the lane at a location in front of the intersection 10 at which the associated traffic signal 12 is provided. The traffic signal information includes at least the turn on time of each of the green signal, the yellow signal, and the red signal, the color of the signal lamp that is currently turned on, and the time elapsed since the signal lamp was turned on.

The vehicle management server 6 functions as a management device for managing the vehicles 3 that can be rented in the car sharing system 2 and consists of a computer including a central processing unit (CPU), a memory, a hard disk drive (HDD), etc. The vehicle management server 6 is equipped with a storage unit 15 configured to store information. The storage unit 15 is constituted of an HDD, a memory, or the like. The vehicle management server 6 is further provided with an HMI 16. The HMI 16 preferably includes a monitor serving as a display 16A and a keyboard and a touch panel serving as an input/output device 16B, for example. The vehicle management server 6 is connected with a route search server 19 via a network 18 such as the Internet. The route search server 19 stores map information and is configured to calculate multiple travel routes connecting between given points. In the present embodiment, the route search server 19 can output road information corresponding to each travel route, such as the road width and the number of lanes of the road 11, for example. The vehicle management server 6 may be placed in either of the stations 7 or may be placed in an office building of the company providing the car sharing service.

Each vehicle 3 includes an HMI 31, a vehicle sensor 32, a position acquisition device 33, an external environment recognizing device 34, a communication device 35, a traffic signal information receiver 36, and a control device 37. The HMI 31, the vehicle sensor 32, the position acquisition device 33, the external environment recognizing device 34, the traffic signal information receiver 36, and the communication device 35 are connected to the control device 37 by means of a communication means such as a controller area network (CAN) so that signals can be transmitted therebetween.

The HMI 31 is provided in the passenger compartment of the vehicle 3 and is configured to notify various information to a vehicle occupant by display and/or sound and to receive an input operation performed by the vehicle occupant. In the present embodiment, the HMI 31 is constituted of a touch panel.

The position acquisition device 33 is a device for detecting the current position (absolute coordinate value represented by a longitude and a latitude) of the vehicle 3 on which the device is mounted (hereinafter referred to as an own vehicle 3) and may be a GPS receiver configured to measure the position of the vehicle 3 by using artificial satellites, for example.

The external environment recognizing device 34 is a device for acquiring surroundings information of the own vehicle 3 to recognize the surroundings of the own vehicle 3 and includes an external camera. The external camera is capable of capturing images an object present in front of the own vehicle 3 such as the vehicle 3 located immediately ahead of the own vehicle 3 (hereinafter referred to as the preceding vehicle), for example. The external camera may be a digital camera utilizing a solid-state image sensor such as a CCD or a CMOS, for example. The external environment recognizing device 34 may include a radar, a lidar, a sonar, etc.

The vehicle sensor 32 is a sensor for detecting the driving state of the own vehicle 3. The vehicle sensor 32 includes a vehicle speed sensor configured to detect the speed of the own vehicle 3, the acceleration sensor configured to detect an acceleration of the own vehicle 3, and an angular velocity sensor configured to detect the angular velocity of the own vehicle 3 around each of three axes. In the present embodiment, the vehicle sensor 32 includes an inertial measurement unit (IMU) 32A provided with a velocity sensor in addition to the acceleration sensor and the angular velocity sensor.

The communication device 35 includes a vehicle-to-vehicle communication device 35A and a mobile communication device 35B for connection with a mobile communication system. The vehicle-to-vehicle communication device 35A is a device for allowing communication between the control device 37 of the own vehicle 3 and the control devices 37 of the other vehicles 3. Namely, the communication device 35 functions as a transmission device for transmitting signals to the control devices 37 mounted on the other vehicles 3 and as a reception device for receiving signals from the control devices 37 mounted on the other vehicles 3. The communication between the vehicle-to-vehicle communication devices 35A of the different vehicles 3 may be performed via electromagnetic waves including light or via sound waves. The mobile communication device 35B is a device for communicating with the base station via electromagnetic waves to make the control device 37 of the own vehicle 3 connected with the Internet. The mobile communication device 35B is preferably one that can be used in the fifth-generation mobile communication system, for example. When a given vehicle 3 is parked in some station 7, the control device 37 mounted on the vehicle 3 can be connected with the vehicle management server 6 via the mobile communication device 35B thereof.

The traffic signal information receiver 36 is a device for receiving the signals transmitted from the traffic signal information transmission devices 14 to acquire the traffic signal information, and includes an optical beacon receiver.

The control device 37 is an electronic control unit (ECU) constituted of a computer including a CPU, a ROM, a RAM, etc. The control device 37 is configured to execute arithmetic processing with the CPU according to the program to control the steering device, the driving device of the engine, motor or the like, the brake device, and so on, thereby performing various vehicle control tasks to control the operation of the own vehicle 3 (the vehicle 3 on which the control device 37 is mounted). The control device 37 may be realized as a single piece of hardware, a unit constituted of multiple pieces of hardware, or a combination of software and hardware.

When a signal indicating that the own vehicle 3 has been set as the leading vehicle 3L (hereinafter referred to as a leading vehicle notification signal) is received from the vehicle management server 6 via the mobile communication device 35B, the control device 37 performs a leading vehicle process. In the leading vehicle process, the control device 37 acquires, from the vehicle management server 6, driving information including information necessary for the worker to drive the leading vehicle 3L. The driving information includes the IDs of the all vehicles 3 to be delivered and route information. The route information includes the delivery route to be traveled by the vehicles 3 and the number of lanes of the road(s) 11 constituting the route. Preferably, when a prescribed input is received by the HMI 31 of the leading vehicle 3L after the delivery of the vehicles 3 is completed, the control device 37 of the leading vehicle 3L transmits a prescribed signal (hereinafter referred to as a vehicle following stop signal) to the control devices 37 of the following vehicles 3F to cause the following vehicles 3F to stop following the leading vehicle 3L.

The driving information may also include formation information regarding the formations of the platoon that can be taken in respective sections of the delivery route. The formation information includes at least information indicating each formation of the platoon and the positions of the following vehicles 3F in each formation. In the present embodiment, as the information indicating the formation of the platoon, the number of rows of the vehicles 3 in the direction perpendicular to the travel direction (hereinafter referred to as the number of rows) is included. For example, in the case of the platoon illustrated in FIG. 4D, the number of rows is 3. The control device 37 of the leading vehicle 3L may be configured to generate the formation information based on the route information as appropriate.

Next, the control device 37 that has received the leading vehicle notification signal (namely, the control device 37 of the leading vehicle 3L) moves the own vehicle 3 to a position where the platoon can be formed. Thereafter, when a moving completion signal, which is a signal indicating that the moving for forming the platoon has completed, is received from the all control devices 37 of the following vehicles 3F, the control device 37 of the leading vehicle 3L transmits a vehicle following start signal to the control devices 37 of the following vehicles 3F. Then, the control device 37 of the leading vehicle 3L causes the HMI 31 to display the delivery route and prompts the worker to drive the leading vehicle 3L along the delivery route by performing a driving operation including steering, acceleration, and deceleration. Thereafter, until a prescribed input indicating that the delivery of the vehicles 3 has completed is made through the HMI 31 by the worker, the control device 37 of the leading vehicle 3L continuously acquires the driving state of the own vehicle 3, which includes the position, vehicle speed, acceleration, angular velocity, and so on, based on the signals from the position acquisition device 33 and the vehicle sensor 32, and continuously transmits the driving state to the control devices 37 of the following vehicles 3F via the vehicle-to-vehicle communication device 35A.

When a signal indicating that the own vehicle 3 has been set as a following vehicle 3F (hereinafter referred to as a following vehicle notification signal) is received from the vehicle management server 6 via the mobile communication device 35B, the control device 37 performs a following vehicle process. In the present embodiment, the following vehicle process includes a platoon forming process and a vehicle following process.

In the platoon forming process, the control device 37 of each following vehicle 3F acquires, from the vehicle management server 6, the identification number of the leading vehicle 3L, the formation of the platoon at the time of start of the vehicle following, and the position of the own vehicle 3 in the platoon at the time of start of the vehicle following. Thereafter, the control device 37 of each following vehicle 3F acquires the position of the leading vehicle 3L and controls the own vehicle 3 such that the own vehicle 3 is moved to the specified position behind the leading vehicle 3L. When the moving of the own vehicle 3 is completed, the control device 37 of each following vehicle 3F transmits the moving completion signal to the control device 37 of the leading vehicle 3L via the vehicle-to-vehicle communication device 35A.

When the platoon forming process and the vehicle following start signal is received from the control device 37 of the leading vehicle 3L, the control device 37 of each following vehicle 3F performs the vehicle following process. In the vehicle following process, the control device 37 of each following vehicle 3F controls the own vehicle 3 to follow the leading vehicle 3L. In the present embodiment, the control device 37 of each following vehicle 3F communicates with the control device 37 of the leading vehicle 3L and causes the own vehicle 3 to follow the leading vehicle 3L according to the driving state of the leading vehicle 3L. Thereby, each following vehicle 3F is brought in a state of electronic connection with the leading vehicle 3L (also referred to as electronic traction).

In the vehicle following process, the control device 37 of each following vehicle 3F acquires, via the vehicle-to-vehicle communication device 35A, the position and the driving state of the leading vehicle 3L based on the acquired identification number. Then, based on the position and the driving state of the leading vehicle 3L thus acquired and the position of the own vehicle 3 acquired by the position acquisition device 33, the control device 37 of each following vehicle 3F performs a path generation process to calculate a path for causing the own vehicle 3 to follow the leading vehicle 3L. Thereafter, the control device 37 performs various vehicle control tasks in combination to cause the own vehicle 3 to travel along the calculated path.

Further, the control device 37 of each following vehicle 3F determines, based on the signal acquired by the external environment recognizing device 34 provided on the own vehicle 3, whether there is a preceding vehicle (a vehicle traveling ahead of the own vehicle 3 with respect to the travel direction) and, if there is a preceding vehicle, acquires the position of the preceding vehicle. The control device 37 controls the own vehicle 3 according to the signal received by the vehicle-to-vehicle communication device 35A and the position of the preceding vehicle to cause the own vehicle 3 to travel such that the inter-vehicle distance between the own vehicle 3 and the preceding vehicle is maintained. Thereby, it is possible to cause each following vehicle 3F to follow the leading vehicle 3L while preventing the collision with the preceding vehicle which is present ahead of each following vehicle 3F with respect to the travel direction.

With each following vehicle 3F being electronically connected with the leading vehicle 3L to follow the leading vehicle 3L, the leading vehicle 3L and the following vehicles 3F travel in the platoon. When the following vehicles 3F line up in a single row behind the leading vehicle 3L and follow the leading vehicle 3L, for example, the control device 37 of each following vehicle 3F preferably controls the own vehicle 3 such that the own vehicle 3 passes each point that the leading vehicle 3L has passed after an inter-vehicle time determined for each following vehicle 3F since the leading vehicle 3L passed the point. While following the leading vehicle 3L, the control device 37 of each following vehicle 3F transmits the position of the own vehicle 3 acquired by the position acquisition device 33 to the control device 37 of the leading vehicle 3L.

The formations of the platoon that can be formed by following of the leading vehicle 3L by the following vehicles 3F include two or more formations having mutually different total lengths. More specifically, the possible formations of the platoon include, a formation in which the vehicles 3 are lined up in a single row (namely, the number of rows is 1 and hereinafter this formation may be referred to as a single-row formation) and a formation in the vehicles 3 are lined up to form multiple rows such that the formation has a total length shorter than that of the single-row formation (namely, the number of rows is 2 or more and hereinafter this formation may be referred to as a multi-row formation). FIG. 4A shows an example in which six vehicles 3 are traveling in the single-row formation, and FIG. 4D shows an example in which six vehicles 3 are traveling in the multi-row formation (more specifically, in the three-row formation).

When a prescribed condition is met while performing the leading vehicle process (namely, while the own vehicle 3 is traveling as the leading vehicle 3L after being set as the leading vehicle 3L), the control device 37 of the leading vehicle 3L causes the HMI 31 to display a formation change button. If the worker touches the formation change button, a formation change process is performed in each of the control devices 37 of the leading vehicle 3L and the following vehicles 3F. The formation change process is a process in which the control devices 37 control the corresponding vehicles 3 in a cooperative manner to change the formation of the platoon in accordance with the formation information. Namely, the HMI 31 functions as a notifying device configured to make a notification to the worker when the formation of the platoon is to be changed.

The formation change process is a process of changing the formation of the platoon to one of the multiple formations having mutually different total lengths (or different platoon widths) and, in the present embodiment, includes a single-row to multi-row formation change process for chaining the formation from the single-row formation to the multi-row formation. FIGS. 4A to 4D show an exemplary mode of moving of the following vehicles 3F when the formation of the platoon is changed from the single-row formation to the multi-row formation in the single-row to multi-row formation change process. In the following, description will be made of a case where the single-row formation is changed to the multi-row formation having a number of rows N in the single-row to multi-row formation change process (N=3 in FIGS. 4A to 4D).

As shown in FIGS. 4A and 4B, in the single-row to multi-row formation change process, firstly, the second to N-th vehicles 3 from the front (namely, the first to (N−1)st following vehicles 3F) are moved to respective lanes that are different from the traveling lane of the first vehicle 3 from the front (the leading vehicle 3L) and that are different from each other. As shown in FIGS. 4B, the (N+1)st vehicle 3 from the front is kept at the same lane as the traveling lane of the leading vehicle 3L. Then, as shown in FIGS. 4B and 4C, the (N+2)nd to 2N-th vehicles 3 from the front are moved to the lanes same as the traveling lanes of the second to N-th vehicles 3 from the front, respectively. Such moving of the vehicles 3 (following vehicles 3F) is repeated until all the vehicles 3 in the platoon are moved to (or stay at) the lanes designated for the respective vehicles 3. Thereby, as shown in FIG. 4C, the vehicles 3 forming the platoon are distributed to the respective lanes as evenly as possible. Thereafter, as shown in FIG. 4D, the control device 37 of each following vehicle 3F increases the speed of the own vehicle 3 to reduce the inter-vehicle distance to the preceding vehicle.

When the formation of the platoon is changed from the single-row formation to the multi-row formation, it is necessary to increase the speed of the following vehicles 3F relative to the leading vehicle 3L, as shown in FIGS. 4C and 4D. In the present embodiment, immediately after the formation change button is touched, the control device 37 of the leading vehicle 3L causes the HMI 31 to make a notification to prompt the worker to decelerate the leading vehicle 3L. Thereby, the worker can follow the display on the HMI 31 to decelerate the leading vehicle 3L so that the change of the formation of the platoon is achieved smoothly.

The formation change process may include a multi-row to single-row formation change process in which the formation of the platoon is changed from the multi-row formation to the single-row formation when a prescribed condition is met. In the present embodiment, in the multi-row to single-row formation change process, the procedure for the single-row to multi-row formation change process is executed in reverse order. Thereby, it is ensured that the change of the formation of the platoon will not change the order of the vehicles 3 in the single-row formation.

The travel of the vehicles 3 in the multi-row formation and the change of the formation of the platoon are preferably performed in such a manner that the control device 37 of each following vehicle 3F generates a path that is different from when the vehicles 3 travel in the single-row formation and causes the following vehicle 3F to travel along the path. Also, when the formation of the platoon is changed from the single-row formation to the multi-row formation, the control device 37 of the following vehicle 3F preferably generates a path for the formation change by linearly moving the points on the path to be followed when traveling in the single-row formation.

The storage unit 15 of the vehicle management server 6 stores a vehicle information table (see FIG. 3) for each station 7. In the vehicle information table, the IDs of the vehicles 3 parked in the corresponding station 7 and the vehicles 3 rented to users from the corresponding station 7 are stored in association with the vehicle specification for evaluating the driving performance of the respective vehicles 3.

The driving performance of each vehicle 3 indicates the ability of the vehicle 3 when driving, and the vehicle management server 6 evaluates the driving performance of each vehicle 3 based on the vehicle specification thereof. The vehicle specification includes at least one of an acceleration performance, a braking (deceleration) performance, and a steering performance, for example. The acceleration performance may be a 0-100 km/h acceleration. The 0-100 km/h acceleration is represented by the time required to reach 100 km/h. The braking performance may be represented by the braking distance when the vehicle is traveling on a prescribed road surface at a prescribed speed (for example, 60 km/h). The steering performance may be represented by the minimum turning radius.

In addition, the vehicle specification of each vehicle 3 may include at least one of the width, the total length, and the weight of the vehicle 3. Also, the vehicle specification may include a motor vehicle type according to the Road Traffic Act, such as a large-sized motor vehicle, a medium-sized motor vehicle, a small-sized motor vehicle, and so on. The vehicle specification may include a motor vehicle type according to the Road Transport Vehicle Act.

Next, an operation of the platooning system 1 will be described. The vehicle management server 6 makes a delivery plan for delivering the vehicles 3 between the stations based on the reservation information and the usage forecast of the car sharing service. The delivery plan includes the ID of the leading vehicle 3L, the IDs of the all vehicles 3 to be delivered, the route information regarding the delivery route, the formation of the platoon at the time of start of the vehicle following, and the position of each vehicle included in the platoon at the time of start of the vehicle following. The delivery plan may also include the formation information, which is the information regarding the formations of the platoon that can be taken in respective sections of the delivery route. The formation information preferably includes at least information indicating each formation of the platoon and the positions of the following vehicles 3F in each formation. The vehicle management server 6 may calculate the usage forecast of the car sharing service based on the past usage history of the users.

More specifically, when making the delivery plan, the vehicle management server 6 first calculates, based on the reservation information, the number of vehicles 3 that are necessary to meet the demand of users at each station. Thereafter, referring to the vehicle information table of each station 7, the vehicle management server 6 acquires the number of vehicles 3 parked in each station 7 and the number of vehicles being rented from each station 7, and calculates the number of vehicles 3 need to be delivered to each station 7 and the number of vehicles 3 that can be delivered from each station 7. Thereafter, the vehicle management server 6 performs matching to determine the stations 7 that should send out the vehicles 3 (hereinafter referred to as sending stations 7S), the stations 7 that should receive the vehicles 3 (hereinafter referred to as receiving stations 7R), and the number of vehicles 3 to be delivered from one station 7 to another. FIG. 1 shows an example in which the vehicles 3 are being delivered from the first station 7A (sending station 7S) to the second station 7B (receiving station 7R).

Subsequently, referring to the vehicle information table of the sending station 7S stored in the storage unit 15, the vehicle management server 6 selects, from among the vehicles 3 parked in the sending station 7S, the vehicles 3 having the driving performance equal to or higher than a prescribed criteria and determines the vehicles 3 to be delivered. Thereby, a vehicle 3 having a driving performance lower than the prescribed criteria is prevented from being included in the platoon formed by the vehicles 3 to be delivered. Thereby, it is possible to prevent some of the vehicles 3 having the driving performance lower than the criteria from falling behind the other vehicles 3 forming the platoon. Namely, the dividing of the platoon can be prevented.

Thereafter, referring to the route search server 19, the vehicle management server 6 acquires multiple travel routes to the given destination, namely, from the sending station 7S to the receiving station 7R. Further, referring to the vehicle information table of the sending station 7S, the vehicle management server 6 extracts the driving performance of each of the vehicles 3 to be delivered. Next, based on the extracted driving performance of each vehicle 3 to be delivered, the vehicle management server 6 selects one of the acquired travel routes that the platoon can travel along and designates the selected travel route as the delivery route. Thereby, it is possible to allow the platoon to arrive at the destination more reliably without being divided into separate parts.

Thereafter, the vehicle management server 6 determines the formation of the platoon during travel of the vehicles 3 along the delivery route. The vehicle management server 6 sets the formation of the platoon at least near the start point and near the end point of the delivery route to the single-row formation in which the leading vehicle 3L is at the front end of the platoon and the following vehicles 3F line up in a single row behind the leading vehicle 3L along the travel direction of the leading vehicle 3L.

The vehicle management server 6 may calculate the formations of the platoon that can be taken in respective sections of the delivery route by referring to the route search server 19 and include the calculated formations of the platoon in the delivery plan. More specifically, the vehicle management server 6 sets the formation of the platoon to the single-row formation in parts of the delivery route other than those where multiple lanes are provided. For the parts of the delivery route where multiple lanes are provided, the vehicle management server 6 sets the formation of the platoon to fully use the width of the road (pathway) on which the platoon travels. More specifically, the vehicle management server 6 sets the number of rows of the platoon to be equal to the number of lanes.

Subsequently, the vehicle management server 6 sets the formation of the platoon at the time of start of the vehicle following to the single-row formation and, referring to the vehicle information table, sets the order of the vehicles 3 in the platoon such that the vehicles 3 are arranged from the front end to the rear end of the platoon with respect to the travel direction in an ascending order of the driving performances of the vehicles 3. In the present embodiment, the vehicle management server 6 sets the order of the vehicles 3 in the platoon (or the positions of the vehicles 3 in the platoon) by arranging the vehicles 3 in an ascending order of the braking performances of the vehicles 3 specified in the vehicle information table. Thereby, the vehicle 3 having the lowest driving performance (in the present embodiment, the lowest braking performance) is positioned at the front of the platoon. It is to be noted that in a case where the braking performance is represented by the braking distance, the ascending order of the driving performances correspond to the descending order of the braking distances.

In another embodiment, the driving performance may be evaluated based on another vehicle specification recorded in the vehicle information table. When the driving performance is evaluated based on the 0-100 km/h acceleration, the ascending order of the driving performances corresponds to the descending order of the 0-100 km/h accelerations. When the driving performance is evaluated based on the minimum turning radius, the ascending order of the driving performances corresponds to the descending order of the minimum turning radiuses. When the driving performance is evaluated based on the width, the ascending order of the driving performances corresponds to the descending order of the widths. When the driving performance is evaluated based on the total length, the ascending order of the driving performances corresponds to the descending order of the total lengths. When the driving performance is evaluated based on the weight, the ascending order of the driving performances corresponds to the descending order of the weights. When the driving performance is evaluated based on the motor vehicle type, the ascending order of the driving performances may be a large-sized special motor vehicle, a small-sized special motor vehicle, a large-sized motor vehicle, a medium-sized motor vehicle, a semi-medium-sized motor vehicle, and an ordinary motor vehicle, for example.

After the order of the vehicles 3 in the platoon has been set, the vehicle management server 6 sets the vehicle 3 positioned at the front end of the platoon as the leading vehicle 3L.

Thereafter, the vehicle management server 6 transmits information containing the delivery plan made as described above to the worker terminal 9. When the worker terminal 9 receives the information containing the delivery plan, the HMI thereof displays the delivery plan and notifies the delivery plan to the worker. Thereafter, the vehicle management server 6 transmits the leading vehicle notification signal to the control device 37 of the vehicle 3 set as the leading vehicle 3L, and transmits the following vehicle notification signal to the control devices 37 of the vehicles 3 set as the following vehicles 3F.

The control device 37 of the vehicle 3 that has received the leading vehicle notification signal moves the own vehicle 3 to a position where the platoon can be formed. The control device 37 of each vehicle 3 that has received the following vehicle notification signal moves the own vehicle 3 to a position set therefor in the platoon at the time of start of the vehicle following. Thereby, the following vehicles 3F are arranged behind the leading vehicle 3L in the order of the vehicles 3 at the time of start of the vehicle following specified in the delivery plan. Namely, based on the leading vehicle notification signal and the following vehicle notification signal from the vehicle management server 6, the vehicles 3 are arranged in the ascending order of the driving performances. It is to be noted, however, that the worker may operate the following vehicles 3F such that the following vehicles 3F line up in a single row behind the leading vehicle 3L to form the platoon in accordance with the delivery plan presented on the worker terminal 9.

After the moving of the vehicles 3 to form the platoon is completed, the control device 37 of each following vehicle 3F transmit the moving completion signal to the control device 37 of the leading vehicle 3L. Upon receipt of the moving completion signal, the control device 37 of the leading vehicle 3L transmits the vehicle following start signal to the control devices 37 of the following vehicles 3F. Thereby, the following vehicles 3F are electronically connected with the leading vehicle 3L, and the following vehicles 3F start following the leading vehicle 3L. Thereafter, the HMI 31 of the leading vehicle 3L displays the delivery route. The worker performs driving operations to make the leading vehicle 3L travel along the delivery route. Thereby, the delivery of the vehicles 3 between the stations 7 is carried out. Immediately after the departure from the sending station 7S, the vehicles 3 travel in the single-row formation in which the vehicles 3 line up in a single row along the travel direction.

When the leading vehicle 3L reaches immediately before an intersection 10, the control device 37 of the leading vehicle 3L determines whether the all vehicles 3 constituting the platoon can pass the intersection 10. Here, "immediately before the intersection 10" indicates a point whose distance from the intersection 10, which is located ahead of the leading vehicle 3L along the travel route, is equal to or smaller than a prescribed value. The prescribed value may be about 10 m, for example, and may be varied depending on the speed of the leading vehicle 3L. At this time, the control device 37 of the leading vehicle 3L preferably determines whether the all vehicles 3 of the platoon can pass the intersection 10 based on the signal from the traffic signal information receiver 36, the positions of the following vehicles 3F acquired via inter-vehicle communication, and the speed of the own vehicle 3 acquired by the vehicle sensor 32. If it is determined that the all vehicles 3 cannot pass the intersection 10, the control device 37 of the leading vehicle 3L determines whether the all vehicle 3 of the platoon can pass the intersection 10 by changing the formation of the platoon to the formation set by the vehicle management server 6. If the control device 37 of the leading vehicle 3L determines that the all vehicles 3 can pass the intersection 10 by changing the formation of the platoon, the HMI 31 of the leading vehicle 3L is caused to display the formation change button.

When the worker touches the formation change button, the formation change process is performed in the control devices 37 of the leading vehicle 3L and the following vehicles 3F. Thereby, the control device 37 of each following vehicle 3F moves the own vehicle 3 in accordance with the arrangement of the vehicles 3 set by the vehicle management server 6. As a result of the change of the formation of the platoon, the platoon width increases and the platoon is brought into the formation that fully uses the available road width. Thereby, the total length of the platoon is decreased. In the present embodiment, when the formation change button is touched, the formation of the platoon is changed from the single-row formation to the multi-row formation including the number of rows equal to the number of lanes.

Note that the control device 37 of the leading vehicle 3L may acquire, when starting the formation change process, the number of lanes of the road 11 on which the own vehicle 3 is traveling based on the signal from the external environment recognizing device 34 and determines the formation of the platoon after the change. At this time, the control device 37 of the leading vehicle 3L may set the formation of the platoon after the change to the multi-row formation including the number of rows equal to the number of lanes.

Also, when the worker touches the formation change button, the HMI 31 is caused to display a notification prompting the worker to decelerate the leading vehicle 3L.

Thereby, the worker can operate the leading vehicle 3L to decelerate the same such that the platoon formation can be changed smoothly.

Once the platoon formation change is completed, the control device 37 of the leading vehicle 3L determines whether the all vehicles 3 constituting the platoon have passed the intersection 10 based on the positions of the following vehicles 3F acquired via the vehicle-to-vehicle communication device 35A. When it is determined that the all vehicles 3 have passed the intersection 10, the control device 37 of the leading vehicle 3L transmits a signal to the control devices 37 of the following vehicles 3F to change the formation of the platoon from the multi-row formation back to the original single-row formation. At this time, preferably, the control devices 37 of the following vehicles 3F execute the process of changing the formation of the platoon from the single-row formation to the multi-row formation in reverse order. More specifically, for example, the control devices 37 of the following vehicles 3F may move the following vehicles 3F to respective positions relative to the leading vehicle 3L as shown in FIG. 4C, and then move the following vehicles 3F to respective positions behind the leading vehicle 3L so that the following vehicles 3F line up in a single row behind the leading vehicle 3L.

When the platoon arrives at the receiving station 7R, the worker stops the leading vehicle 3L and performs an input operation with the HMI 31 to terminate the vehicle following. In response to this, the control device 37 of the leading vehicle 3L transmits the vehicle following stop signal to the control devices 37 of the following vehicles 3F to stop the vehicle following process in the following vehicles 3F. Thereby, the following vehicles 3F are released from the electronic connection. Thereafter, the control device 37 of each following vehicle 3F may move the own vehicle 3 to an appropriate position to park the same there, or the worker may drive each following vehicle 3F to an appropriate position to park the same there. Subsequently, the worker uses the worker terminal 9 to transmit a signal indicating the completion of the delivery to the vehicle management server 6. Upon receipt of the signal indicating the completion of the delivery, the vehicle management server 6 deletes the data of the vehicles 3 that have been delivered from the sending station 7S from the vehicle information table of the sending station 7S and adds the data of the vehicles 3 delivered to the receiving station 7R to the vehicle information table of the receiving station 7R.

Next, description will be made of the advantages of the platooning system 1 configured as described above. Based on the leading vehicle notification signal and the following vehicle notification signal from the vehicle management server 6, the vehicles 3 are arranged in the ascending order of the driving performances.

Particularly, when the vehicles 3 are traveling in the single-row formation, as the distance from the leading vehicle 3L to the following vehicle 3F becomes larger, the signal arrives at the following vehicle 3F with a larger delay and the delay propagates such that the following vehicles 3F at or near the rear end of the platoon tend to become unable to follow the leading vehicle 3L sufficiently. In the present embodiment, the vehicles 3 in the platoon are arranged such that the vehicle 3 closer to the rear end has a higher driving performance, and therefore, even if there is a delay in the signal from the leading vehicle 3L to the following vehicles 3F or the like, the vehicles 3 at or near the rear end can easily follow the leading vehicle 3L. Thereby, it is possible to prevent the platoon from being divided into separate parts.

As shown in FIG. 3, the driving performance of each vehicle 3 is evaluated based on the vehicle specification including at least one of the braking performance, the minimum turning radius, the acceleration performance, and the size of the vehicle 3. Thereby, the ability of each following vehicle 3F to follow the leading vehicle 3L can be evaluated easily.

When the leading vehicle 3L reaches immediately before an intersection 10, the HMI 31 of the leading vehicle 3L is caused to display the formation change button. The worker can change the formation of the platoon from the single-row formation to the multi-row formation by touching the formation change button. Compared to the platoon in the single-row formation, the platoon in the multi-row formation can reduce time required from when the platoon enters the intersection 10 to when the all vehicles 3 of the platoon exit the intersection 10. Therefore, it is possible to avoid a situation in that the traffic signal switches from green to red while the platoon is passing the intersection 10, which would result in the dividing of the platoon.

In the present embodiment, when the formation change button is touched, the platoon formation is changed to the multi-row formation including the number of rows same as the number of lanes. Thereby, the total length of the platoon is reduced and the formation of the platoon is changed to fully use the road width. Therefore, the time required from when the platoon enters the intersection 10 to when the all vehicles 3 of the platoon exit the intersection 10 can be reduced further. Since the formation of the platoon is changed in accordance with the road width, dividing of the platoon can be prevented more reliably compared to the case where the formation of the platoon is not changed in accordance with the road width.

Next, detailed description will be given of the path generation process performed by the control device 37 of each following vehicle 3F when the formation of the platoon is changed. First, description will be made of the path generation process performed by the control device 37 of each following vehicle 3F while the vehicles 3 are traveling in the single-row formation.

The control device 37 of each following vehicle 3F stores in the storage thereof history information of the position of the leading vehicle 3L relative to the own vehicle 3, which is obtained from the position of the leading vehicle 3L transmitted from the control device 37 of the leading vehicle 3L and the position of the own vehicle 3 acquired by the position acquisition device 33, and history information of the vehicle speed, the acceleration, the angular velocity, etc. of each of the own vehicle 3 and the leading vehicle 3L. The control device 37 of each following vehicle 3F controls the own vehicle 3 such that the own vehicle 3 passes a target point set at an appropriate interval by the control device 37 itself with a target speed, a target acceleration, and a target angular velocity which are also set by the control device 37 itself at an appropriate interval. For example, when the vehicles 3 are traveling in the platoon of the single-row formation in which the leading vehicle 3L is positioned at the front and the following vehicles 3F line up in a single row along the travel direction, the control device 37 of each following vehicle 3F sets the point passed by the leading vehicle 3L before a prescribed time (hereinafter referred to as a delay time) as the target point. Also, the control device 37 of each following vehicle 3F may set the speed, the acceleration, and the angular velocity of the leading vehicle 3L when the leading vehicle 3L passed that point as the target speed, the target acceleration, and the target acceleration, respectively. It is to be noted, however, that the control device 37 of each following vehicle 3F also controls the own vehicle 3 based on the signal from the external environment recognizing device 34 as necessary such that the inter-vehicle distance to the preceding vehicle does not become equal to or smaller than a prescribed constant value. In the following, the sequence of target points may be referred to as a path.

The delay time for each following vehicle 3F may be preferably determined based on the distance between the leading vehicle 3L and the following vehicle 3F at the time when the vehicle following is started and the travel speed of the platoon (which may be represented by the speed of the leading vehicle 3L or the speed of each following vehicle 3F). In the present embodiment, the delay time T for the i-th vehicle 3 (or (i−1)st following vehicle 3F) from the front is calculated by the following formula (1):

$$T=(i-1) \times T_0 \tag{1}$$

Here, $T_0$ is the time from when the leading vehicle 3L passes a certain point to when the following vehicle 3F immediately behind the leading vehicle 3L (namely, the second vehicle 3 from the front or the first following vehicle 3F) passes the same point, which may be referred to as an inter-vehicle time. The inter-vehicle time is preferably determined based on an appropriate inter-vehicle distance and travel speed.

Next, detailed description will be made of the single-row to multi-row formation change process, which is one type of the formation change process. The control device 37 of the leading vehicle 3L first determines, based on the position of each following vehicle 3F relative to the leading vehicle 3L, the number of each following vehicle 3F from the front (which represents the position of each following vehicle 3F in the platoon). Then, based on the number of each following vehicle 3F from the front, the number of lanes of the road on which the platoon is traveling, the position of the lane on which the leading vehicle 3L (and hence the following vehicles 3F as well) is traveling, and the width of each lane, the control device 37 of the leading vehicle 3L calculates a shift amount for each following vehicle 3F necessary for the formation change of the platoon.

For example, when the vehicles 3 in the single-row formation are traveling on the j-th lane from the left of the road 11 having the number of lanes M and each lane has a width of d meters, the control device 37 of the leading vehicle 3L calculates the shift amount xi for the i-th vehicle 3 from the front ((i−1)st following vehicle 3F) according to the following formula (2):

$$xi=[\{(i+j-2) \bmod M\}-j+1] \times d \tag{2}$$

Figure 5B:
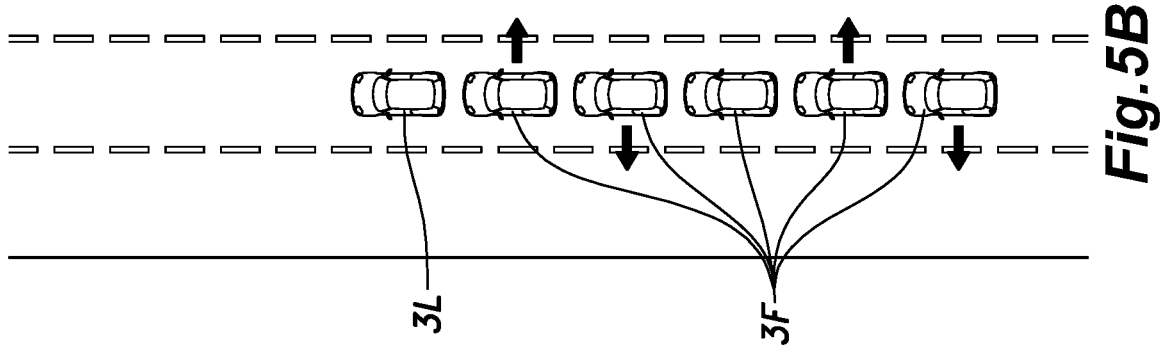
FIG. 5B is an explanatory diagram for explaining shift amounts of the vehicles in the single-row to multi-row (three-row) formation change process in a case where the vehicles in the single-row formation are traveling in the second lane from the left.
Figure 5A:
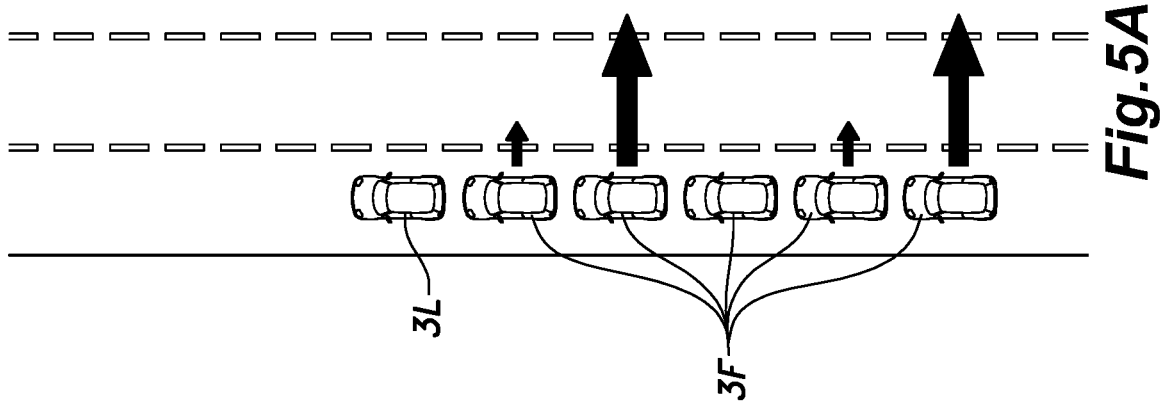
FIG. 5A is an explanatory diagram for explaining shift amounts of the vehicles in the single-row to multi-row (three-row) formation change process in a case where the vehicles in the single-row formation are traveling in the leftmost traveling lane.

Note that the shift amount xi is defined such that a rightward shift with respect to the travel direction is represented by a positive value and a leftward shift with respect to the travel direction is represented by a negative value, and "mod" in the formula (2) is a modulo operator, where "a mod M" represents an operation calculating the remainder after division of a by M. The control device 37 of the leading vehicle 3L notifies the calculated shift amount to the control device 37 of each following vehicle 3F. In FIGS. 5A and 5B, the moving direction corresponding to the shift amount xi is represented by the direction of an arrow, while the amplitude of the shift amount xi is represented by the length of the arrow. FIG. 5A shows an exemplary case in which M=3 and j=1, while FIG. 5B shows an exemplary case in which M=3 and j=2.

Subsequently, each of the control devices 37 of the second to M-th vehicles 3 (first to (M−1)st following vehicles 3F) moves the target point linearly toward the position shifted by the corresponding shift amount xi in the lateral direction from the point that the leading vehicle 3L has passed the delay time T ago. FIGS. 6A to 6C illustrate a mode of moving of the following vehicle 3F following immediately behind the leading vehicle 3L in FIG. 5A. FIG. 6A shows the arrangement of the vehicles 3 at the time when the formation change from the single-row formation to the multi-row formation is started, and FIG. 6C shows the arrangement of the vehicles 3 at the time when the moving of the following vehicle 3F to the position shifted by the shift amount xi has completed. In FIG. 6A and FIG. 6B, target points P1 and P2, which are set at times different by the inter-vehicle time, are shown. Thus, by moving the target point linearly toward the position shifted by the shift amount xi as shown in FIG. 6A, it is possible to move each vehicle 3 to the corresponding traveling lane. Further, between FIG. 6A and FIG. 6C, the control device 37 of the following vehicle 3F preferably controls the own vehicle 3 such that the target speed, the target acceleration, and the target angular velocity become substantially equal to the speed, the acceleration, and the angular velocity of the leading vehicle 3L the delay time T ago. Thereafter, the (M+2)nd and later vehicles 3 are moved by the respective shift amounts (note that the (M+1)st vehicle 3 stays in the same lane as the leading vehicle 3L), whereby, as shown in FIG. 4C, the all vehicles 3 constituting the platoon are distributed to the respective rows as evenly as possible.

Thereafter, each of the control devices 37 of the following vehicles 3F changes the corresponding delay time T to a delay time Tm for the multi-row formation, as indicated by the following formula (3):

$$T=(i-1) \times T0 \rightarrow Tm=[i/M] \times T0 \tag{3}$$

Here, "[ ]" in the formula (3) is a Gauss symbol (floor function), and "i" is the number of each vehicle 3 from the front. As a result of the change of the delay time T to the delay time Tm for the multi-row formation, in the case of the following vehicle 3F following immediately behind the leading vehicle 3L (namely, the second vehicle 3 from the front) in FIG. 5A, for example, the target point moves to the side of the leading vehicle 3L as shown in FIG. 6C (from P3 to P4 in FIG. 6C) and accordingly, the following vehicle 3F is accelerated. Each of the third and later vehicles 3 from the front are similarly steered toward the path obtained by shifting the path of the leading vehicle 3L by the corresponding shift amount (except for those that should stay in the same lane, for which the shift amount is zero). Also, each following vehicle 3F for which there is no preceding vehicle is accelerated or decelerated so as to be positioned substantially abreast of the leading vehicle 3L, and each following vehicle 3F for which there is a preceding vehicle is accelerated or decelerated such that inter-vehicle distance to the preceding vehicle is maintained (see FIG. 4C). Thereby, the change from the single-row formation to the multi-row formation is completed, and the single-row to multi-row formation change process is terminated.

In the foregoing, the present invention has been described in terms of a preferred embodiment thereof. However, the present invention is not limited to such embodiment and various modifications and alterations may be made within the scope of the present invention. For instance, when it is detected, based on the information acquired by the external environment recognizing device 34 or the traffic signal information receiver 36, that there is a narrow part in the road 11 on which the platoon is traveling due to construction or the like, the control device 37 of the leading vehicle 3L may transmit a signal to the control devices 37 of the following vehicles 3F to temporarily change the formation of the platoon to reduce the platoon width. Thereby, when there is a narrow part in the road 11 on which the platoon is traveling, the platoon width is reduced temporarily so that the platoon can travel through the narrow part. Thereby, the dividing of the platoon can be prevented.

Figure 7C:
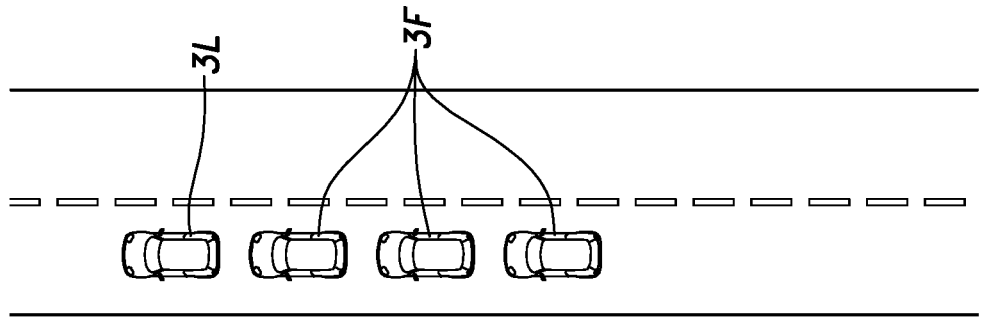
FIG. 7C is an explanatory diagram showing the vehicles moved to the single-row formation.
Figure 7B:
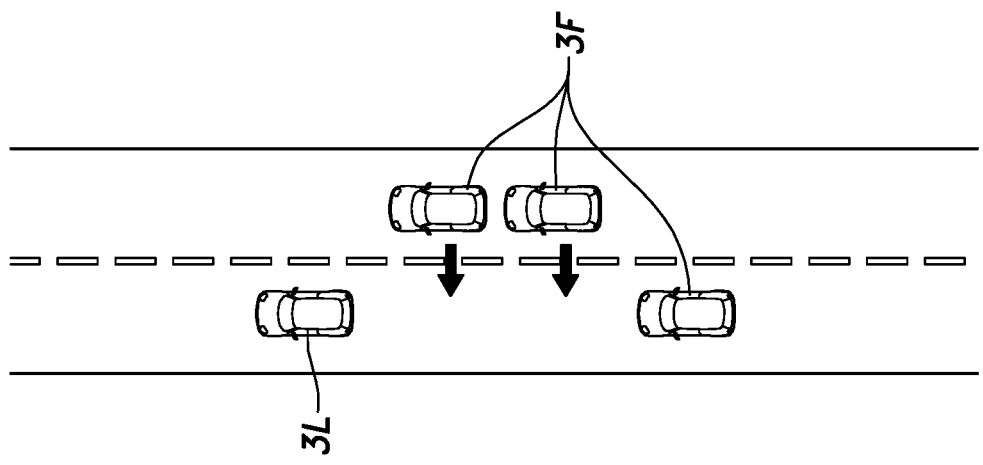
FIG. 7B is an explanatory diagram for showing the moving vehicles in process of moving from the multi-row formation of FIG. 7A to the single-row formation.
Figure 7A:
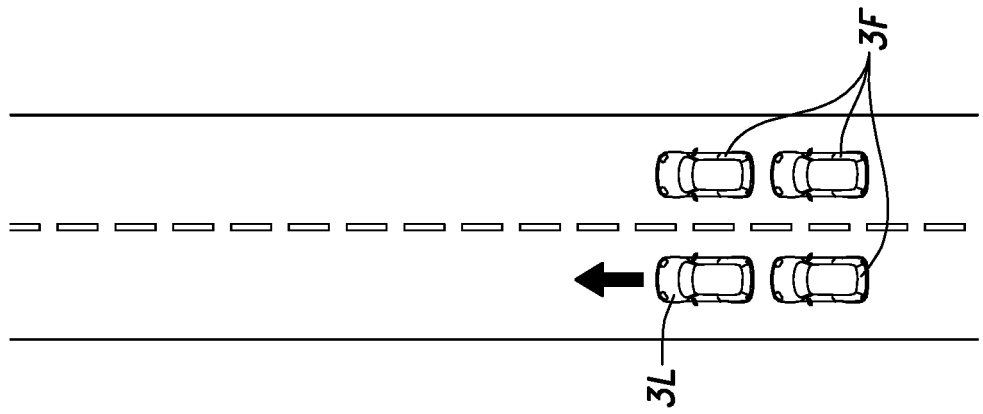
FIG. 7A is an explanatory diagram for explaining a mode of moving vehicles in a multi-row formation to a single-row formation change process according to another embodiment.
Figure 8D:
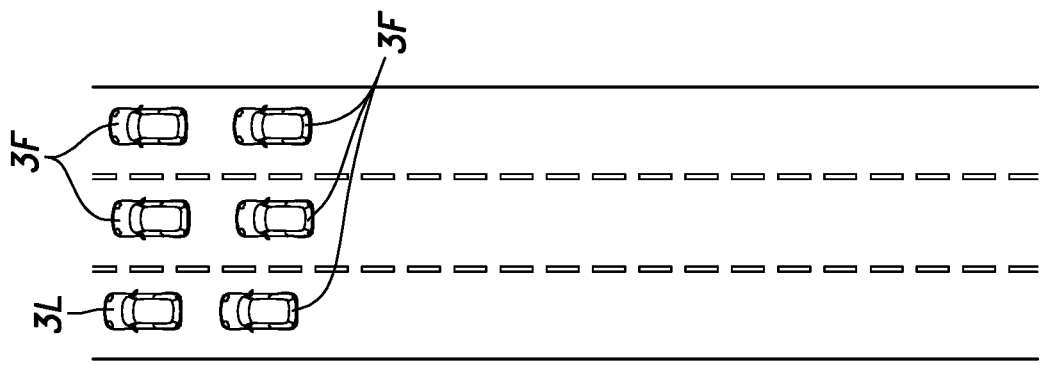
FIG. 8D is an explanatory diagram showing the vehicles in the multi-row formation.
Figure 8C:
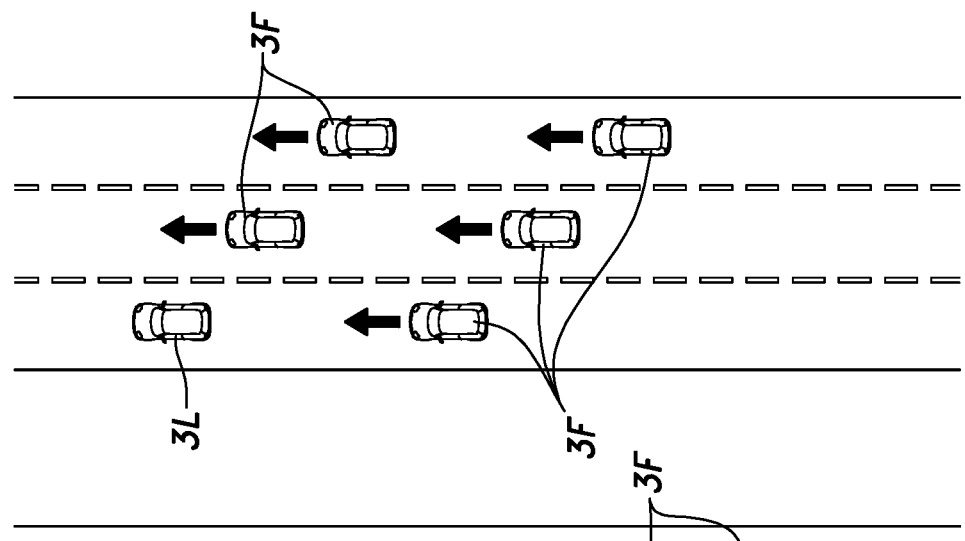
FIG. 8C is an explanatory diagram further showing the change process for moving the vehicles of FIG. 8A to a multi-row formation.
Figure 8B:
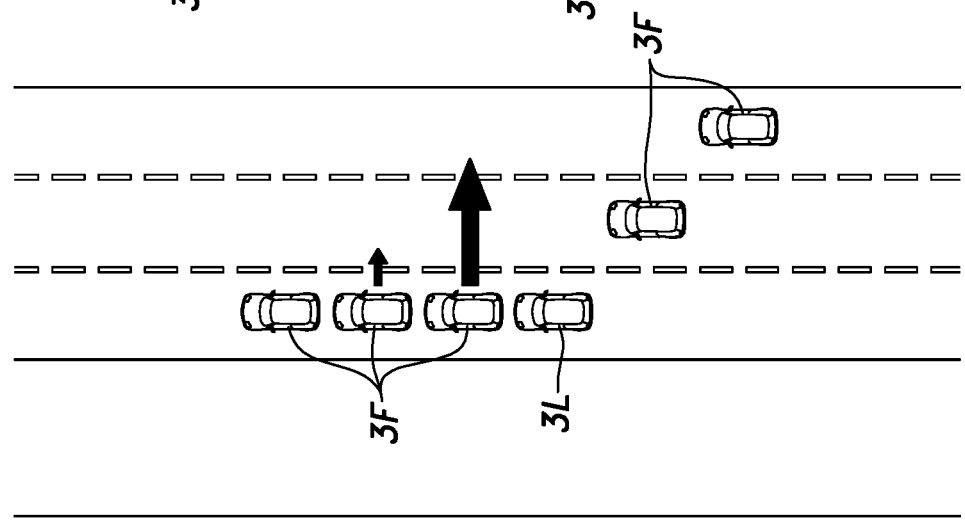
FIG. 8B is an explanatory diagram showing the change process for moving the vehicles from the single-row formation of FIG. 8A to a multi-row formation.
Figure 8A:
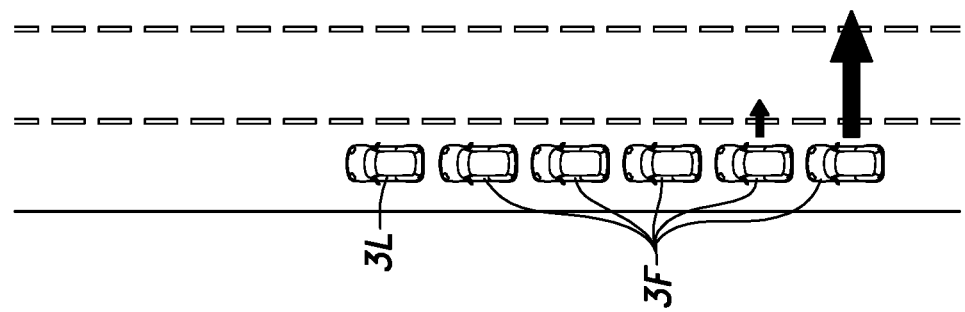
FIG. 8A is an explanatory diagram showing the vehicles in a single-row formation.

In the multi-row to single-row formation change process in the above-described embodiment, the procedure for the single-row to multi-row formation change process is executed in reverse order, but the present invention is not limited to this embodiment. As shown in FIGS. 7A to 7C, to change the formation from the multi-row formation back to the single-row formation, it is sometimes necessary to secure a space for the following vehicles 3F to enter the single-row platoon. In such a case, as shown in FIG. 7B, the following vehicle 3F positioned behind the leading vehicle 3L may preferably decelerate to secure a space to accommodate the other following vehicles 3F. Thereafter, the control devices 37 of the following vehicles 3F traveling on another lane move the respective following vehicles 3 into the space between the leading vehicle 3L and the following vehicle 3F positioned behind the leading vehicle 3L sequentially. Thereby, the platoon formation is changed from the multi-row formation to the single-row formation. At this time, the moving of the following vehicles 3F into the space may be preferably carried out by linearly shifting the respective target points defined in the current lane to on the lane to which the following vehicles 3F are to be moved in a similar manner as described above with reference to FIGS. 6A to 6C.

In the above-described embodiment, configuration was made such that in the single-row to multi-row formation change process, the moving of the vehicles 3 was carried out sequentially from the following vehicle 3F immediately behind the leading vehicle 3L as shown in FIGS. 4A to 4D, but the present invention is not limited to this embodiment. For example, as shown in FIGS. 8A to 8D, configuration may be made such that the vehicles 3 are moved to the respective target lanes sequentially from the following vehicle 3F positioned at the rear end of the single-row formation. Thereby, compared to the case where the vehicles 3 are moved to the respective target lanes sequentially from the following vehicle 3F positioned in a front part of the single-row formation (see FIG. 9A), cut-in by a vehicle traveling behind the single-row formation while the platoon formation is being changed by the single-row to multi-row formation change process can be prevented more effectively (see FIG. 9B).

In the above-described embodiment, the platooning system 1 was used to deliver multiple vehicles 3 between two stations 7, but the present invention is not limited to this an embodiment. For example, the platooning system 1 may be used for the purpose of delivering multiple tracked vehicles, such as bulldozers, in forest or the like or for the purpose of delivering motorized carts capable of following another cart.

In the above-described embodiment, the inertial measurement unit 32A includes a velocity sensor in addition to an acceleration sensor and an angular velocity sensor, but the present invention is not limited to this embodiment. The inertial measurement unit 32A does not have to include a velocity sensor, and the vehicle sensor 32 may be configured to include such an inertial measurement unit 32A and a velocity sensor. Further, the control device 37 and the inertial measurement unit 32A may cooperate to function as a so-called inertial navigation device, which integrates the acceleration and the angular velocity acquired by the acceleration sensor and the angular velocity sensor to thereby acquire the speed, the position, and the attitude angle.

In the above-described embodiment, configuration was made such that when the worker touches the formation change button, the formation change process was started, but the present invention is not limited to this embodiment. For example, configuration may be made such that the vehicles 3 are moved automatically to change the formation of the platoon in accordance with the formation of the platoon calculated by the vehicle management server 6. Also, in the above-described embodiment, the change of the platoon formation was performed immediately before the intersection 10, but configuration may be made such that the formation change is performed when the platoon is passing the intersection 10. Further, configuration may be made such that when the platoon formation is changed, the control devices 37 of the following vehicles 3F each communicate with the control device 37 of the leading vehicle 3L via inter-vehicle communication, calculate the necessary shift amount or the like as appropriate, and change the position of the corresponding vehicle accordingly.

Also, in the above-described embodiment, the worker getting on the leading vehicle 3L performs the driving operation of the leading vehicle 3L, but the present invention is not limited to this embodiment. For example, the worker may operate the leading vehicle 3L remotely or the leading vehicle 3L may be a self-driving car that can travel autonomously.

Also, in the above-described embodiment, description was made of an example in which the vehicles are motor vehicles, but the present invention is not limited to this embodiment. The vehicles described in the present disclosure may include any moving object that can autonomously move in the fore and aft direction and the lateral direction. More specifically, for example, the vehicles may be autonomously movable robots, wheelchairs, unicycles, motorcycles, etc. In this case, the width of the multi-row formation may be preferably set in accordance with the environment in which the moving objects are assumed to move.

The invention claimed is:

1. A platooning system for causing multiple vehicles to travel in a platoon, comprising:
   a management device configured to set an order of the vehicles in the platoon;
   a transmission device mounted on each vehicle and configured to transmit driving information regarding a driving state of the vehicle;
   a reception device mounted on each vehicle and configured to receive the driving information of at least one of the vehicles; and
   a control device mounted on each vehicle and configured to control an operation of the vehicle based on the driving information,
   wherein the management device is configured to arrange the vehicles from a front end to a rear end with respect to a travel direction in an ascending order of driving performances of the vehicles, the driving performance of each vehicle being determined based on a vehicle specification including a width of the vehicle.

2. The platooning system according to claim 1, wherein the vehicle specification further includes a minimum turning radius of the vehicle.

3. The platooning system according to claim 1, wherein the management device is configured to acquire multiple travel routes to a given destination and to select one of the acquired travel routes that the platoon can travel along.

4. The platooning system according to claim 1, wherein the management device is configured to reject inclusion of a vehicle into the platoon when the driving performance of the vehicle is below a prescribed criterion.

5. A platooning system for causing multiple vehicles to travel in a platoon in which one or more following vehicles follow a leading vehicle, the system comprising:
- a management device configured to set a formation of the platoon and an arrangement of the vehicles in the platoon;
- a transmission device mounted on the leading vehicle and configured to transmit a driving state of the leading vehicle;
- a reception device mounted on each following vehicle and configured to receive the driving state of the leading vehicle from the transmission device; and
- a control device mounted on each following vehicle and configured to control the vehicle on which the control device is mounted based on a signal received by the reception device of the vehicle on which the control device is mounted,
- wherein the management device is configured to set the formation of the platoon to one of multiple formations having mutually different total lengths,
- wherein the management device is configured to change the formation of the platoon and the arrangement of the vehicles so as to reduce the total length of the platoon and increase the number of rows of the platoon immediately before the platoon reaches a prescribed section where a time during which the section can be passed is limited or when the platoon is passing the prescribed section.

6. The platooning system according to claim 5, wherein the management device is configured to set the formation of the platoon and the arrangement of the vehicles to fully use a width of a pathway on which the platoon travels.

7. The platooning system according to claim 5, wherein the vehicle at a front end of the platoon is provided with a notifying device for making a notification to a vehicle occupant, and
- when the management device changes at least one of the formation of the platoon and the arrangement of the vehicles immediately before the platoon reaches the prescribed section or when the platoon is passing the prescribed section, the notifying device makes the notification to the vehicle occupant.

* * * * *